(12) United States Patent
Caballero et al.

(10) Patent No.: US 9,816,821 B2
(45) Date of Patent: Nov. 14, 2017

(54) LOCATION SYSTEMS FOR HANDHELD ELECTRONIC DEVICES

(75) Inventors: Ruben Caballero, San Jose, CA (US); Robert J. Hill, Salinas, CA (US)

(73) Assignee: Apple Inc., Cupertino, CA (US)

( * ) Notice: Subject to any disclaimer, the term of this patent is extended or adjusted under 35 U.S.C. 154(b) by 2112 days.

(21) Appl. No.: 12/204,739

(22) Filed: Sep. 4, 2008

(65) Prior Publication Data
US 2010/0057359 A1 Mar. 4, 2010

(51) Int. Cl.
*G01C 21/00* (2006.01)
*G01C 21/20* (2006.01)
*G01C 21/16* (2006.01)
*G01C 21/36* (2006.01)

(52) U.S. Cl.
CPC .......... *G01C 21/20* (2013.01); *G01C 21/165* (2013.01); *G01C 21/36* (2013.01)

(58) Field of Classification Search
CPC .................................... G01C 21/20
USPC .......................................... 701/214
See application file for complete search history.

(56) References Cited

U.S. PATENT DOCUMENTS

| | | | |
|---|---|---|---|
| 5,862,511 A | 1/1999 | Croyle et al. | |
| 5,928,309 A | 7/1999 | Korver et al. | |
| 6,029,111 A | 2/2000 | Croyle | |
| 6,308,134 B1 * | 10/2001 | Croyle et al. | 701/220 |
| 7,117,286 B2 * | 10/2006 | Falcon | 710/303 |
| 7,603,230 B2 * | 10/2009 | Suzuki et al. | 701/209 |
| 2003/0018428 A1 * | 1/2003 | Knockeart et al. | 701/210 |
| 2007/0020588 A1 * | 1/2007 | Batcheller et al. | 434/30 |
| 2008/0000301 A1 * | 1/2008 | Davidson | 73/654 |
| 2008/0147461 A1 * | 6/2008 | Lee et al. | 705/7 |
| 2008/0215286 A1 * | 9/2008 | Mealy et al. | 702/150 |
| 2008/0224659 A1 * | 9/2008 | Singh | 320/114 |
| 2009/0093981 A1 * | 4/2009 | Withanawasam | 702/93 |

* cited by examiner

*Primary Examiner* — Neha Patel
(74) *Attorney, Agent, or Firm* — Treyz Law Group, P.C.; G. Victor Treyz; Kendall W. Abbasi (57) ABSTRACT

An electronic device such as a portable electronic device is provided. The device may have wireless circuitry such as a global satellite navigation system receiver for receiving global satellite navigation system signals and for producing corresponding global satellite navigation system data. The global satellite navigation system data may include information on the current position of the portable electronic device. The portable electronic device may also have one or more sensors that are used to gather data in addition to the global satellite navigation system data. The sensors may include accelerometers and other devices capable of determining how the portable electronic device is oriented with respect to the Earth's magnetic field and how the device is being moved. When the device is moved, the movement and resulting change in orientation may be used in conjunction with the global satellite navigation system data to compute a current geographic location.

4 Claims, 7 Drawing Sheets

LOCATION SYSTEMS FOR HANDHELD ELECTRONIC DEVICES

BACKGROUND

This invention relates to electronic devices, and more particularly, to circuitry for determining the location of electronic devices.

Electronic devices such as handheld electronic devices and other portable electronic devices are becoming increasingly popular. Examples of handheld devices include handheld computers, cellular telephones, media players, and hybrid devices that include the functionality of multiple devices of this type. Popular portable electronic devices that are somewhat larger than traditional handheld electronic devices include laptop computers and tablet computers.

Some handheld devices such as certain handheld communications devices may include global positioning system (GPS) technology. A device with global positioning capabilities may use signals from earth-orbiting navigation satellites to ascertain the device's position. A global positioning system receiver gathers signals from the navigation satellites. Global positioning system circuitry analyses data from the receiver to calculate the current position of the device. This circuitry may also be used to generate information on speed, direction of motion, and time.

Accurate GPS measurements require sufficient signal strength. Particularly in portable devices in which space may be at a premium, it may be difficult to allocate a large amount of circuit resources for GPS functions. For example, it may be difficult or impossible to provide a device with a large GPS antenna and complex GPS receiver circuitry given space constraints and desired device aesthetics. As a result, it may be difficult or impossible to obtain accurate GPS information as rapidly as desired. This may limit the ability of the portable device to perform operations such as offering a user real time navigation assistance.

It would therefore be desirable to be able to provide electronic devices with improved capabilities for implementing location-based services.

SUMMARY

A portable electronic device is provided that may have global satellite navigation system capabilities. Accelerometers and other sensors may be used in conjunction with a global satellite navigation system receiver to produce information on the current geographic location of the portable electronic device and device movement.

In an illustrative embodiment, the portable electronic device may have a global satellite navigation system receiver such as a global positioning system receiver. The receiver may be coupled to an antenna and may be used to receive satellite data. Based on the satellite data, the portable electronic device may compute the geographic location of the device. The geographic location of the device is typically influenced by movements that are not immediately reflected in the satellite data. Inaccuracies that might be produced by this type of movement can be mitigated or eliminated by using the accelerometer data from an accelerometer to gather movement data. The accelerometer may, for example, detect changes in the device's position and may, based on this information, be used to compute the device's current position, orientation, direction of movement, and speed. Sensor data such as compass data may be gathered to determine how the device is oriented with respect to the Earth's magnetic field.

Data from accelerometers and other sensors may be processed together with the global satellite navigation system receiver to enhance the geographic positioning capabilities of the portable electronic device.

Further features of the invention, its nature and various advantages will be more apparent from the accompanying drawings and the following detailed description of the preferred embodiments.

DETAILED DESCRIPTION

The present invention relates generally to electronic devices, and more particularly, to electronic devices that have sensor circuitry for generating location data. The location data may be, for example, information on the current geographical coordinates of the device. If desired, information on the movement of the device and its orientation may also be generated. Information on device location, orientation, and movement may be processed and used by software such as navigation software that provides real time navigation directions. The software may be used, for example, to display the location of a user of the device on a map. These are merely illustrative examples of software that may use accurate location-based data. In general, any suitable software and hardware may be implemented in an electronic device that makes use of data on the device's location, orientation, and movement.

The electronic devices may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices may be wireless electronic devices.

The wireless electronic devices may be, for example, handheld wireless devices such as cellular telephones, media players with wireless communications capabilities, handheld computers (also sometimes called personal digital assistants), remote controllers, global positioning system (GPS) devices, and handheld gaming devices. The wireless electronic devices may also be hybrid devices that combine the functionality of multiple conventional devices. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

Figure 1:
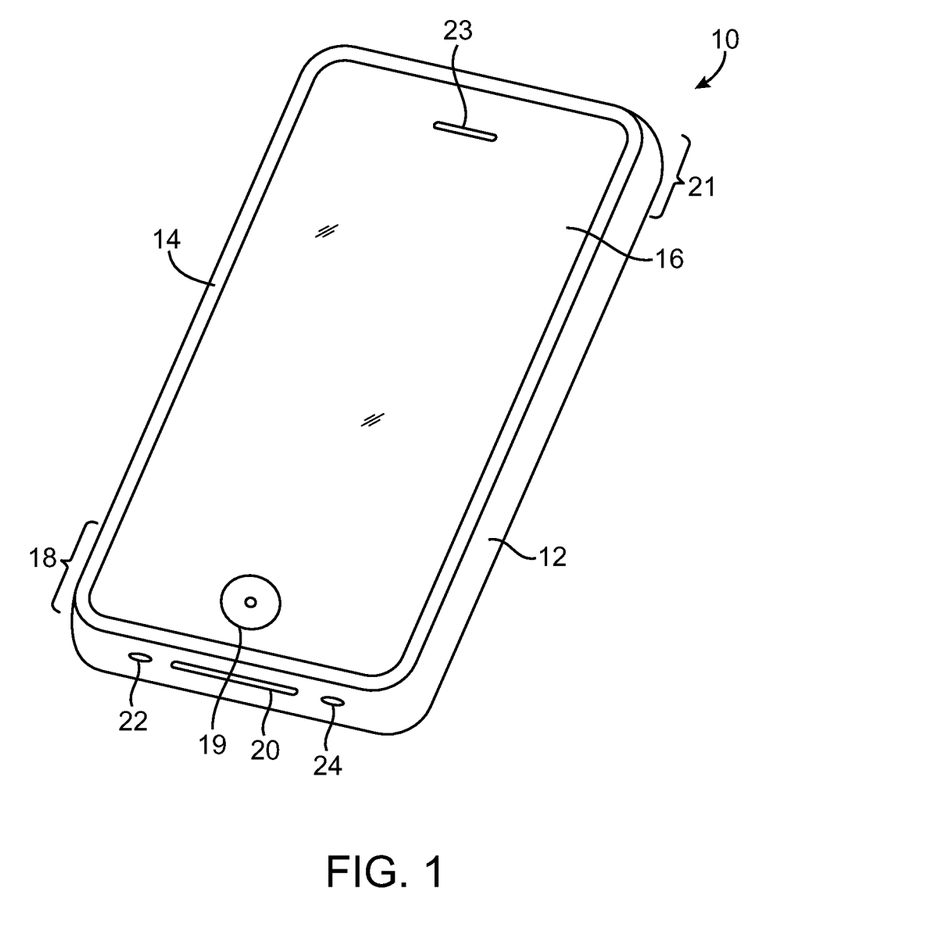
FIG. 1 is a perspective view of an illustrative portable electronic device in accordance with an embodiment of the present invention.

An illustrative portable electronic device in accordance with an embodiment of the present invention is shown in FIG. 1. Device 10 of FIG. 1 may be, for example, a handheld electronic device that supports 2 G and/or 3 G cellular telephone and data functions, global positioning system capabilities or other satellite navigation capabilities, and local wireless communications capabilities (e.g., IEEE 802.11 and Bluetooth®) and that supports handheld computing device functions such as internet browsing, email and calendar functions, games, music player functionality, etc.

Device 10 may have housing 12. Antennas for handling wireless communications may be housed within housing 12 (as an example). These antennas may include one or more antennas that are used to receive wireless location signals. The wireless location signals may be received in the form of signals from navigation satellites such as global positioning system satellites. An antenna for receiving these signals (i.e., a GPS antenna) may be integrated with other antenna structures or may be provided as a stand-alone antenna structure.

Housing 12, which is sometimes referred to as a case, may be formed of any suitable materials including, plastic, glass, ceramics, metal, or other suitable materials, or a combination of these materials. In some situations, housing 12 or portions of housing 12 may be formed from a dielectric or other low-conductivity material, so that the operation of conductive antenna elements that are located in proximity to housing 12 is not disrupted. Housing 12 or portions of housing 12 may also be formed from conductive materials such as metal. An advantage of forming housing 12 from a dielectric material such as plastic is that this may help to reduce the overall weight of device 10.

In scenarios in which housing 12 is formed from metal elements, one or more of the metal elements may be used as part of the antennas in device 10. For example, metal portions of housing 12 may be shorted to an internal ground plane in device 10 to create a larger ground plane element for that device 10. Housing 12 may have a bezel such as bezel 14 that surrounds display 16. Bezel 14 may be formed from a conductive material or other suitable material and may be used as part of the antennas in device 10. For example, bezel 14 may be shorted to printed circuit board conductors or other internal ground plane structures in device 10 to form part of an antenna ground plane.

Display 16 may be a liquid crystal display (LCD), an organic light-emitting diode (OLED) display, or any other suitable display. The outermost surface of display 16 may be formed from one or more plastic or glass layers. If desired, touch screen functionality may be integrated into display 16 or may be provided using a separate touch pad device. An advantage of integrating a touch screen into display 16 to make display 16 touch sensitive is that this type of arrangement can save space and reduce visual clutter. Touch screen displays such as display 16 may be formed from capacitive touch sensors or any other suitable touch sensors (e.g., resistive touch sensors, touch sensors based on light or sound waves, etc.). An advantage of capacitive touch sensors is that they may be used to sense the presence of an object even when the object is not in direct contact with display 16.

Display screen 16 (e.g., a touch screen) is merely one example of an input-output device that may be used with electronic device 10. If desired, electronic device 10 may have other input-output devices. For example, electronic device 10 may have user input control devices such as button 19, and input-output components such as port 20 and one or more input-output jacks (e.g., for audio and/or video). Button 19 may be, for example, a menu button. Port 20 may contain a 30-pin data connector (as an example). Openings 22 and 24 may, if desired, form speaker and microphone ports. Speaker port 22 may be used when operating device 10 in speakerphone mode. Opening 23 may also form a speaker port. For example, speaker port 23 may serve as a telephone receiver that is placed adjacent to a user's ear during operation. In the example of FIG. 1, display screen 16 is shown as being mounted on the front face of handheld electronic device 10, but display screen 16 may, if desired, be mounted on the rear face of handheld electronic device 10, on a side of device 10, on a flip-up portion of device 10 that is attached to a main body portion of device 10 by a hinge (for example), or using any other suitable mounting arrangement.

A user of electronic device 10 may supply input commands using user input interface devices such as button 19 and touch screen 16. Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Although shown schematically as being formed on the top face of electronic device 10 in the example of FIG. 1, buttons such as button 19 and other user input interface devices may generally be formed on any suitable portion of electronic device 10. For example, a button such as button 19 or other user interface control may be formed on the side of electronic device 10. Buttons and other user interface controls can also be located on the top face, rear face, or other portion of device 10. If desired, device 10 can be controlled remotely (e.g., using an infrared remote control, a radio-frequency remote control such as a Bluetooth® remote control, etc.).

If desired, device 10 may contain sensors such as a proximity sensor and an ambient light sensor. A proximity sensor may be used to detect when device 10 is close to a user's head or other object. An ambient light sensor may be used to make measurements of current light levels.

To improve location data accuracy and to allow device 10 to support functions that benefit from accurate location information, device 10 may contain sensors that gather information on the movement and orientation of device 10. Data from these sensors may be combined with location data from a global positioning system receiver or other suitable source to allow accurate computation of device location. Sensor data may also be processed to determine information on the orientation and movement of device 10. As an example, sensor data may be processed to determine whether device 10 is being held in portrait or landscape orientation. Orientation data may be gathered using any suitable format. For example, orientation data may be made up of angular orientation in all three perpendicular rotational axes: pitch, yaw, and roll. Sensor data may include acceleration data. The acceleration data may include linear acceleration values (e.g., linear acceleration in one, two, or three dimensions) and/or angular acceleration values.

Components such as display 16 and other user input interface devices may cover most of the available surface area on the front face of device 10 (as shown in the example of FIG. 1) or may occupy only a small portion of the front face of device 10. Because electronic components such as display 16 often contain large amounts of metal (e.g., as radio-frequency shielding), the location of these components relative to the antenna elements in device 10 should generally be taken into consideration. Suitably chosen locations for the antenna elements and electronic components of the device will allow the antennas of electronic device 10 to function properly without being disrupted by the electronic components.

Examples of locations in which antenna structures may be located in device 10 include region 18 and region 21. These are merely illustrative examples. Any suitable portion of device 10 may be used to house antenna structures for device 10 if desired.

Any suitable antenna structures may be used in device 10. For example, device 10 may have one antenna or may have multiple antennas. The antennas in device 10 may each be used to cover a single communications band or each antenna may cover multiple communications bands. If desired, one or more antennas may cover a single band while one or more additional antennas are each used to cover multiple bands.

In arrangements in which antennas are needed to support communications at more than one band, the antennas may have shapes that support multi-band operations. For example, an antenna may have a resonating element with arms of various different lengths and/or a ground plane with slots of various different sizes that resonate in desired radio-frequency bands. Inverted-F antenna elements, planar inverted-F antenna elements or other antenna structures may be used in the presence of an antenna slot to form a hybrid slot/non-slot antenna.

Antennas (e.g., hybrid slot/non-slot antennas or other suitable antennas) may be used at one end or both ends of device 10. For example, one such antenna may be used as a dual band antenna (e.g., in region 21) and one such antenna may be used as a pentaband antenna (e.g., in region 18). A GPS antenna structure for receiving GPS signals may be provided as a separate antenna element or may be incorporated into the dual band antenna, the pentaband antenna, or other multiband antenna.

Figure 2:
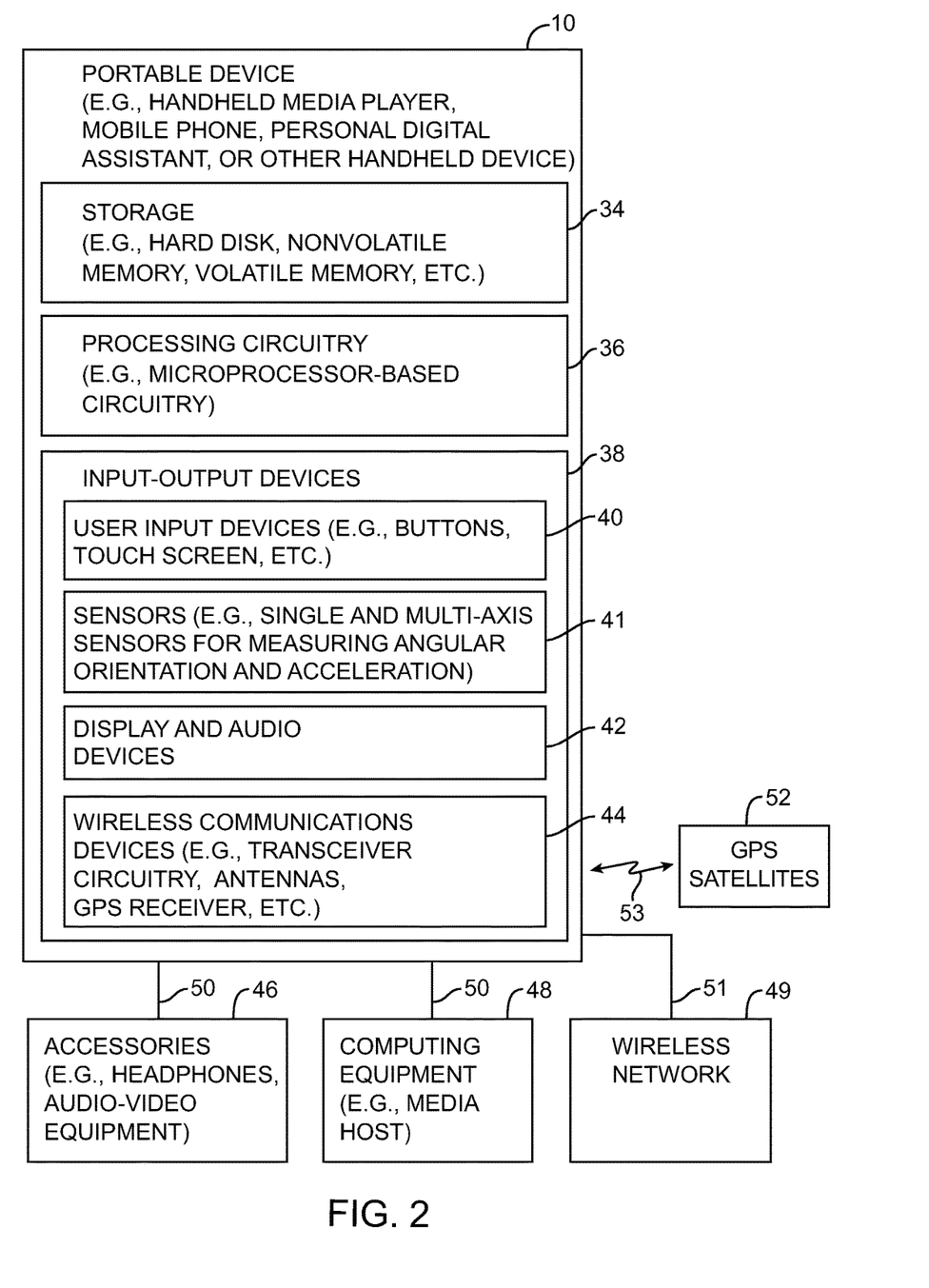
FIG. 2 is a schematic diagram of an illustrative portable electronic device in accordance with an embodiment of the present invention.

A schematic diagram of an embodiment of an illustrative portable electronic device such as a handheld electronic device is shown in FIG. 2. Portable device 10 may be a mobile telephone, a mobile telephone with media player capabilities, a handheld computer, a remote control, a game player, a global positioning system (GPS) device, a laptop computer, a tablet computer, an ultraportable computer, a hybrid device that includes the functionality of some or all of these devices, or any other suitable portable electronic device.

As shown in FIG. 2, device 10 may include storage 34. Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used to control the operation of device 10. Processing circuitry 36 may be based on a processor such as a microprocessor and other suitable integrated circuits. With one suitable arrangement, processing circuitry 36 and storage 34 are used to run software on device 10, such as internet browsing applications, voice-over-internet-protocol (VOIP) telephone call applications, email applications, media playback applications, navigation functions, map functions, operating system functions, etc. Processing circuitry 36 and storage 34 may be used in implementing suitable communications protocols. Communications protocols that may be implemented using processing circuitry 36 and storage 34 include internet protocols, wireless local area network protocols (e.g., IEEE 802.11 protocols—sometimes referred to as Wi-Fi®), protocols for other short-range wireless communications links such as the Bluetooth® protocol, protocols for handling 3 G communications services (e.g., using wide band code division multiple access techniques), 2 G cellular telephone communications protocols, etc.

Input-output devices 38 may be used to allow data to be supplied to device 10 and to allow data to be provided from device 10 to external devices. Display screen 16, button 19, microphone port 24, speaker port 22, and dock connector port 20 are examples of input-output devices 38. In general, input-output devices 38 may include any suitable components for receiving input and/or providing output from device 10. For example, input-output devices 38 can include user input-output devices 40 such as buttons, touch screens, joysticks, click wheels, scrolling wheels, touch pads, key pads, keyboards, microphones, cameras, etc. A camera may, if desired, be provided with image stabilization capabilities (e.g., using feedback derived from an accelerometer, orientation sensor, or other sensor). A user can control the operation of device 10 by supplying commands through user input devices 40.

Input-output devices 38 may include sensors 41 such as proximity sensors and ambient light sensors. Sensors 41 may also include sensors that may be used in determining the location, orientation, and movement of device 10. These sensors may include, for example, accelerometers and orientation sensors. Acceleration may, if desired, be measured along one, two, or three linear axes and, if desired, may be measured about one, two, or three angular axis (pitch, yaw, and roll). Orientation may be measured using one, two, or three angular orientation axes (pitch, yaw, and roll). Changes in orientation can be used to compute acceleration data and measured acceleration values can be used to compute orientation data, so terms such as "orientation sensor" and "accelerometer" need not be used in a mutually exclusive fashion.

Geographic location may be monitored using, for example, global positioning system signals. Location data may also be produced by combining sensor signals from sensors 41 in input-output devices 38 with data from global positioning system circuits and other sources.

Any suitable sensor technology may be used for sensors 41. For example, sensors 41 may include one or more compasses. Compass-type devices may be formed, for example, using magnetic structures that sense the orientation of device 10 relative to the Earth's magnetic field. The magnetic structures may include permanent magnets and electromagnets. If desired, sensors 41 may include gyroscope devices. Devices that operate according to gyroscopic principals can detect motion such as rotational motion of device 10 on one, two, or three axes. Gyroscopic sensors may include, for example, one or more elements that vibrate along a particular axis or rotating structures.

Sensors 41 may be constructed so that they are small enough to fit within the tight confines of device 10. As an example, sensors 41 may be fabricated using micro-electrical mechanical systems structures, also known as MEMS. MEMS devices may be fabricated from miniature structures such as cantilevers ("diving boards") formed from under-etched crystalline silicon (as an example). Cantilevered structures may be caused to oscillate (e.g., by using a clock signal derived from a quartz oscillator or other suitable source of periodic signals). Oscillating structures may be used as high-accuracy accelerometers (e.g., by exploiting gyroscopic principals). Sensors such as these may, if desired, include magnetic elements such as permanent magnets and momentarily active electromagnets, weights, piezoelectric elements, electrical contacts, conductive traces for actuating parts of the sensors and for gathering sensor signals, and control circuitry. The control circuitry may include communications circuitry for transmitting sensor signals over an appropriate communications path (e.g., a serial or parallel bus such as an $I^2C$ bus, an analog path, etc.).

Display and audio devices 42 may include liquid-crystal display (LCD) screens or other screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications). Satellite-based location sensing equipment such as a GPS receiver may be included in devices 44. A GPS receiver may provide processed location data (e.g., geographic coordinates in the form of longitude and latitude coordinates), raw GPS signals (e.g., location signals that form precursors to actual longitude and latitude coordinates), or any other suitable GPS signals for producing location information. If desired, location information may be generated using cellular telephone tower time-of-flight and triangulation techniques. As an example, cellular telephone network equipment may be able to determine where device 10 is geographically located by determining which cellular telephone tower is communicating with device 10. This type of technique may, for example, be used to determine which "cell" a user is occupying. Time-of-flight data may be used to ascertain a user's distance from the currently active cell tower. Triangulation techniques may be applicable in systems in which a user's device is reachable from equipment associated with at least two different cellular telephone towers. Once network-based location information has been gathered in this way, the location information may be shared with the device (e.g., by wirelessly transmitting the location information to the device from the network). Device 10 can receive wirelessly transmitted navigation signals (whether from a GPS source such as earth-orbiting navigation satellites or from a terrestrial source such as a cellular telephone network) using wireless communications devices 44.

Device 10 can communicate with external devices such as accessories 46, computing equipment 48, wireless network 49, and navigation satellites 52 (e.g., global positioning system satellites), as shown by paths 50, 51, and 53. Paths 50 may include wired and wireless paths. Paths 51 and 53 may be wireless paths. Accessories 46 may include headphones (e.g., a wireless cellular headset or audio headphones) and audio-video equipment (e.g., wireless speakers, a game controller, or other equipment that receives and plays audio and video content), a peripheral such as a wireless printer or camera, etc.

Computing equipment 48 may be any suitable computer. With one suitable arrangement, computing equipment 48 is a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another portable electronic device 10), or any other suitable computing equipment.

Wireless network 49 may include any suitable network equipment, such as cellular telephone base stations, cellular towers, wireless data networks, computers associated with wireless networks, etc. For example, wireless network 49 may include network management equipment that monitors wireless signals from device 10 to determine the location of device 10 (e.g., by triangulation, time-of-flight, etc.) and that relays this location information back to device 10 over link 51. Location information may also be generated by analyzing which local area networks are within range of device 10. Device 10 may, for example, use information on which (if any) IEEE 802.11 (Wi-Fi®) hotspots are within range of device 10 to help determine the location of device 10.

Global positioning system satellites 52 may emit navigational signals that are monitored by a GPS receiver in wireless communications circuitry 44.

Figure 3:
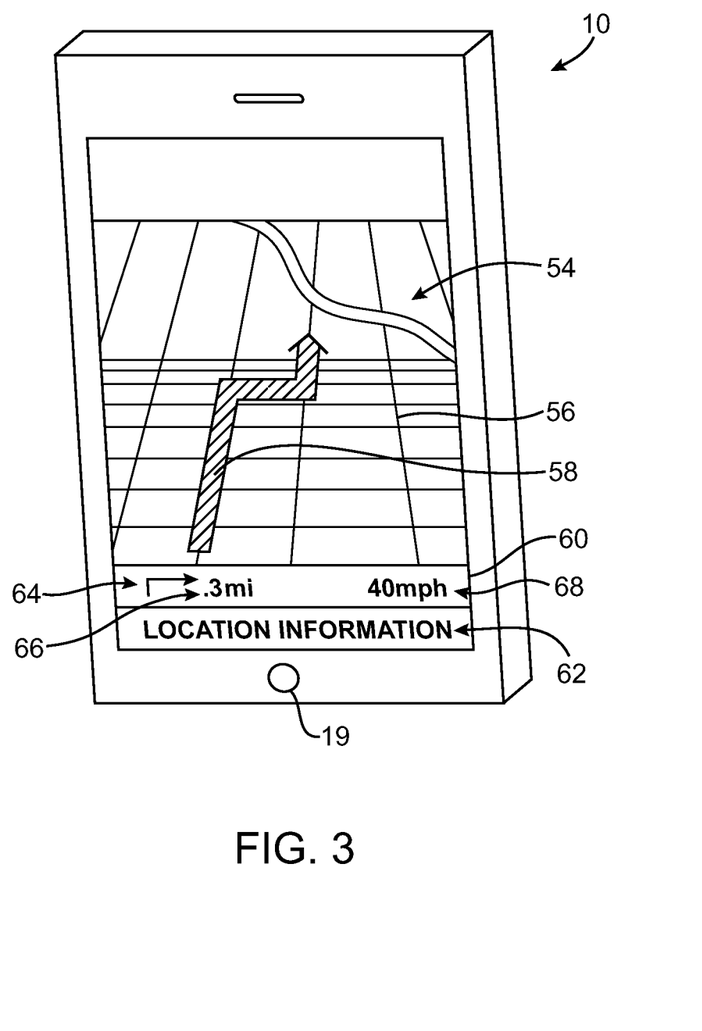
FIG. 3 is a perspective view of an illustrative portable electronic device in which location data is being used to provide a user with real-time navigation assistance in accordance with an embodiment of the present invention.

Location information may be used in device 10 to support applications such as navigation. An illustrative display screen 54 that may be displayed by navigation software on device 10 is shown in FIG. 3. As shown in FIG. 3, screen 54 may include map information 56. Directions may be provided in the form of a suggested route 58. In the example of FIG. 3, route 58 is displayed in the form of an overlay on top of map information 56 (e.g., superimposed on streets within display screen 54). This is merely illustrative. Any suitable visual indicator or other arrangement may be used to provide a user of device 10 with navigational directions. The directions may be used as driving directions when a user and device 10 are located within an automobile or other moving vehicle and may be used as walking directions when the user is a pedestrian.

If desired, screen 54 may include regions such as regions 60 and 62. Region 60 may be used to display turning directions. The turning directions may include, for example, an icon or text that indicates the nature of the next upcoming turn. In the FIG. 3 example, region 60 includes right-turn arrow 64 to indicate to the user that the next turn to be made is a right turn. Turn distance 66 indicates the distance until the next turn (i.e., the distance from the user's present location to the turn indicated by turn indicator 64). Speed information 68 may be provided within region 60. Speed information 68 may correspond to the current speed at which device 10 is moving in the direction indicated by path 58.

One or more regions such as region 62 may be provided to display the current location of device 10. Information in region 62 may include GPS coordinates, longitude and latitude, orientation of device 10 relative to the Earth's north pole (i.e., compass heading information), orientation information (e.g., whether or not device 10 is level with respect to the plane of the earth's surface), or any other suitable information on the movement, orientation, and geographic location of device 10. If desired, the information of display 54 and regions 60 and 62 may be provided using other input-output schemes (e.g., visually using light-emitting diodes or other dedicated visual indicators, using sound, using combinations of these techniques, etc.). Software that may be used in presenting this information to the user includes navigation software (e.g., software that presents turn-by-turn driving directions, software that presents maps, etc.). In these software applications, the user's current position may be indicated (e.g., as in a map) or the user's current position may be used as a point of reference (e.g., when computing the distance to a turn in turn-by-turn driving directions).

To ensure that the location of device 10 is even in environments where the user is moving rapidly, it may be desirable to combine data from more than one source. This allows the location information in device 10 to be sufficiently accurate to plot the user's position on a detailed map (as an example).

With one illustrative arrangement, which is sometimes described herein as an example, GPS data may be combined with data from sensors such accelerometers and orientation sensors. In this type of arrangement, the GPS location may serve as a baseline upon which data from the accelerometer and/or orientation sensor equipment is used to improve. Hybrid schemes such as this may make it possible to produce more accurate location data than would be available when using only GPS data.

It may be particularly advantageous to supplement the data received from a GPS source in devices with relatively weak GPS signals. Weak signals may result from challenging operating environments (such as cities with tall buildings that block line-of-sight communications with navigational satellites) and devices that, due to their compact nature, are not able to use large antennas and high-performance GPS receivers.

Figure 4:
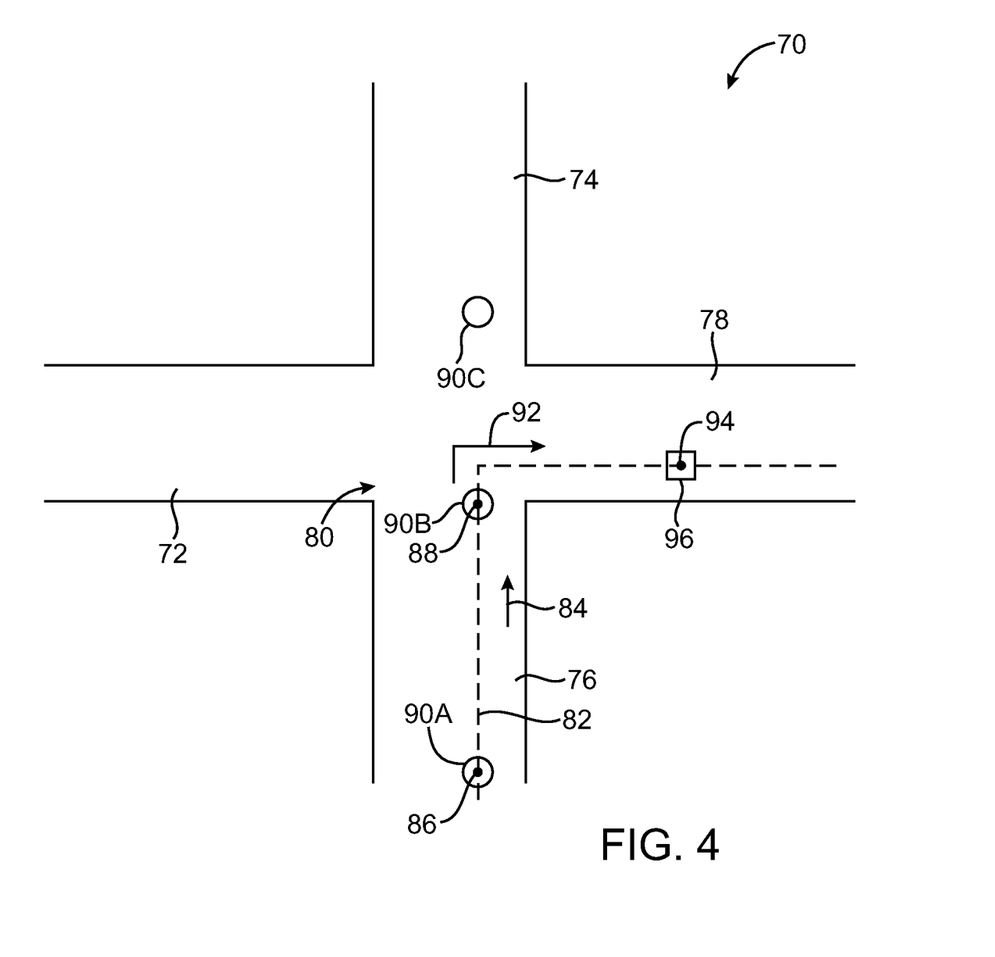
FIG. 4 is a diagram comparing the performance of a conventional device to a portable electronic device in accordance with an embodiment of the present invention when providing read-time mapping information to a user.

The potentially adverse impact of a weak GPS signal on a user application in which device location is being used is shown in FIG. 4. In the example of FIG. 4, a map such as map 70 is being displayed on the display of the user's device. The illustrative map of FIG. 4 has four streets 72, 74, 76, and 78 that meet at four-way intersection 80. The user is traveling along the path indicated by dashed line 82. The user may, for example, be traveling in an automobile. Initially, the user may be at location 86. A moment later, the user may be at location 88. The user may then make a right-hand turn along path 82, as indicated by arrow 92 to reach the user's current position (location 94). When using a device with a weak GPS signal, the refresh rate of the GPS location will be limited (e.g., to a fraction of a second or longer between successive location data points). In this type of environment, the device will not be able to capture the user's location rapidly. As a result, the user's plotted location may no longer coincide with the user's actual location.

Consider, as an example, the situation in the example of FIG. 4, in which the user's position is plotted with circles 90. To keep up with the motion of the user, the user's device might extrapolate from the current GPS data to predict the user's actual location at any given time. When the user is following a straight path such as when traveling along street 76, this type of approach may be sufficiently accurate. Plotted position 90A may accurately represent the fact that the user is located at location 86. A moment later, when the user has arrived at location 88, the user's device may accurately predict that the user will be located at that location and may accurately plot circle 90B in anticipation. Because the device does not have any advance notice of turn 92, however, the device's next plotted location (location 90C) will not accurately track the user's actual location (location 94). This is because location 90C was predicated based on GPS data acquired previously (e.g., when the user was located at position 88). When out-of-date GPS data is used in this way, the location accuracy of the user's device can suffer, rendering the device unsuitable for applications such as automobile navigation in which timely turning instructions based on accurate location information are required.

With embodiments of the present invention, in contrast, sensor data such as accelerometer data and orientation data may be used to accurately sense the point in time at which the user makes turn 92. Even though GPS data may not be immediately available that accurately reflects that the user has made turn 92, the non-GPS sensor data (e.g., accelerometer data and/or orientation data) may be used to determine the amount by which the user has turned (e.g., 90°) and the time at which the turn was made (i.e., when the user reached intersection 80). From knowledge of the amount by which the user's device turned and recent GPS data (e.g., information on the last measured GPS location of the user, the user's velocity and heading, and the time at which that GPS location, velocity, and heading were acquired, the user's current position (e.g., position 94) may be accurately plotted. In the example of FIG. 4, the user's present location on map 70 has been plotted in this way by device 10 using square location icon 96.

In order to accurately measure turn data, the user may be required to orient device 10 in a particular known fashion. For example, accurate location data may be obtained by requiring the user to orient device 10 so that the plane that contains the front face of device 10 (e.g., display 16) lies parallel with the plane of the earth's surface. Alternatively, the user may be instructed to orient device 10 so that the longer edges of the device's housing 12 are oriented perpendicular to the earth's surface (i.e., oriented parallel with respect to the gravitational axis of the earth). When the angular orientation of device 10 is known relative to the earth, device 10 may rely on a data from sensors that have relatively few axes of sensitivity (if desired). For example, a single angular orientation sensor (compass-type) might be used to determine when device 10 has made left and right turns on a map. This type of turn data may also be gathered by processing information from an accelerometer that is capable of detecting the angular acceleration that results from a right or left turn. Because the sensors in this example are oriented in a known orientation when making measurements, sensors with additional axes of sensitively need not be provided.

If desired, however, more complex sensors may be used. As an example, a sensor may be used to sense linear acceleration in three dimensions (x, y, and z). As another example, so-called six degrees-of-freedom sensors may be used in which three linear axes of acceleration and three angular accelerations (along the pitch, yaw, and roll axes) are measured. Orientation sensors (e.g., with one, two, or three axes of coverage) may also be used. Angular and linear acceleration and angular orientation measurements may, in general, be provided using any suitable sensor hardware (e.g., compass-based sensors such as sensors with permanent magnetic or electromagnetic structures, gyroscopic sensors such as sensors with vibrating elements or otherwise moving elements, MEMS devices, combinations of such devices, etc.) Each of these components may be provided with any suitable number of axes of coverage (e.g., one, two, three, etc.).

In environments such as these, the orientation of the sensor with respect to Earth may be determined. Once the Earth's position relative to device 10 is determined in this fashion, the signals from the sensors may be normalized to compensate for the present orientation of the device. Consider, as an example, a sensor that measures angular acceleration. By using an accelerometer (e.g., a three-access accelerometer), device 10 can determine whether device 10 is oriented in a horizontal fashion (as when lying on a table) or is in an upright portrait orientation. This may be accomplished by detecting the direction in which the Earth's gravitational pull is acting on the accelerometer. When the device is in the horizontal orientation, the yaw axis of an angular accelerometer sensor (and/or the yaw axis of an angular orientation sensor) in the device may be used to produce turn data. When, however, device 10 determines that the device is in the upright portrait orientation, device 10 may use signals from the roll axis of an angular accelerometer sensor (and/or the roll axis of an angular orientation sensor) to determine when turns are being made. If device 10 is oriented in a landscape fashion (with its left-hand edge facing downwards), device 10 can monitor the pitch axis of an angular accelerometer sensor (or the pitch axis of an angular orientation sensor) when determining whether or not a turn is being made.

Figure 5:
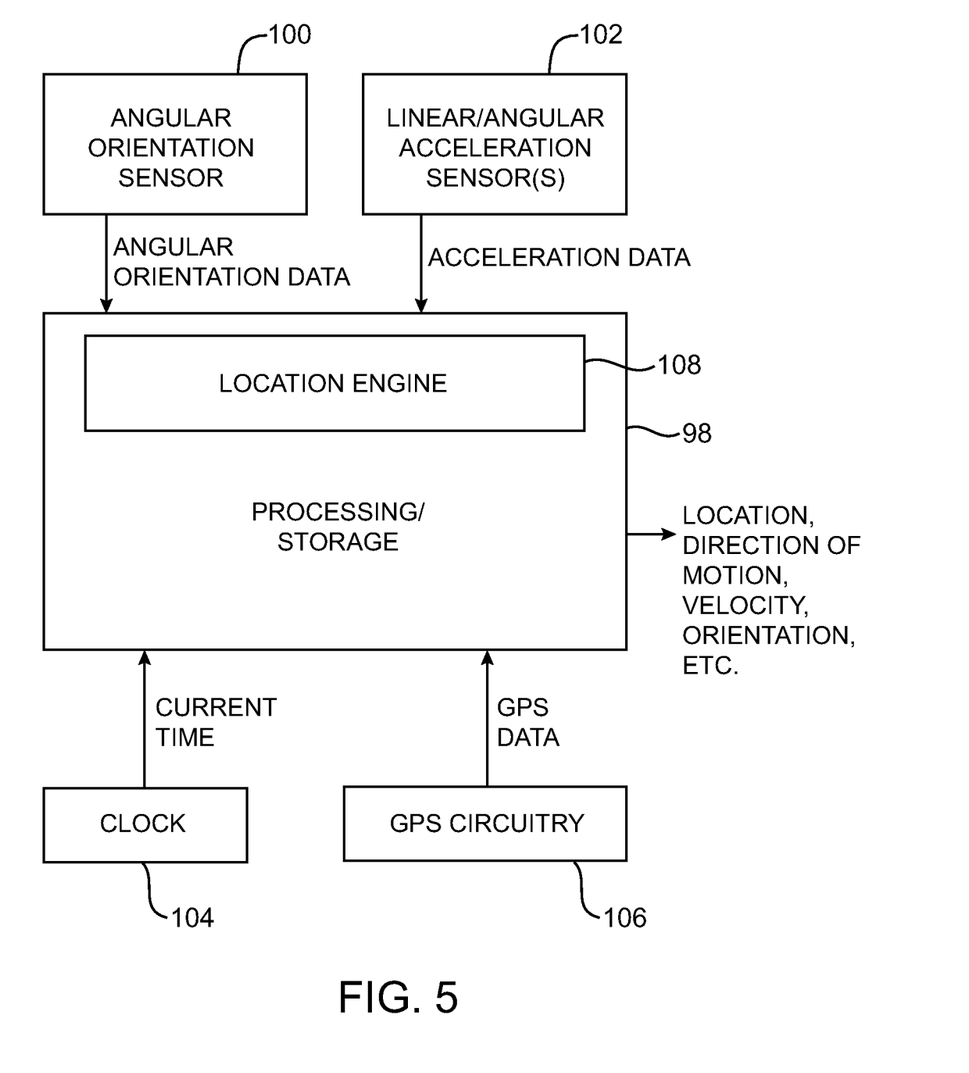
FIG. 5 is a diagram showing how a location engine may be used in computing accurate up-to-date position-related data in a portable electronic device in accordance with an embodiment of the present invention.

GPS receiver data and data from sensors may be processed using the processing capabilities of device 10. An illustrative processing arrangement that may be used in analyzing GPS receiver data and data from sensors is shown in FIG. 5. As shown in FIG. 5, device 10 may have processing circuitry and storage 98 (i.e., storage 34 and processing circuitry 36 of FIG. 2) on which a data processing engine such as location engine 108 may be implemented. Processing circuitry and storage 98 may include general purpose processors such as microprocessors and more dedicated processors such as the processing circuits that may be included in a GPS receiver or sensor circuits. For example, a sensor may include circuitry in processing circuitry 98 that produces preprocessed heading data over a digital bus (as an example). In this type of arrangement, it is not necessary for the microprocessor circuitry of device 10 to be used to compute the user's current compass heading from raw sensor data. In other configurations, some of the sensor data may be provided in a raw format that is processed by general purpose processing circuitry in device 10 to compute the user's location, motion, and orientation. Combinations of these approaches may also be used.

Engine 108 may be used to produce data on the geographic position of device 10 and associated movement data (e.g., data on the user's velocity and heading). Current and predicted (future) location and movements may be produced. Inputs to engine 108 may include historical data and current data. Historical data may be stored in storage 34. Current data may be acquired in real time from a GPS receiver and from sensors. If desired, current data may be cached in storage 34 to facilitate processing. During some operations, engine 108 may display historical data for a user. For example, engine 108 may retrieve stored data on a user's previously known position when requested by a user or as part of a map or other display. In a typical scenario, a user's current location and a trail indicating the user's previously taken path may be displayed in a navigation application. Route guidance may also be displayed in the form of a suggested path (e.g., path 58 of FIG. 3).

As shown in FIG. 5, location engine 108 may receive data from multiple sources. GPS circuitry 106 may be used to provide location engine 108 with GPS data. GPS circuitry 106 may include a GPS receiver implemented using one or more integrated circuits. The GPS receiver may be connected to a dedicated GPS antenna or part of a shared multiband antenna. A bus or other signal path may be used to convey GPS position information to a microprocessor or other suitable processing circuitry for analysis by engine 108. If desired, the processing circuitry may also convey information to the GPS receiver. For example, if the processing circuitry is aware of the general geographic location of device 10 (e.g., the country or other geographic region in which device 10 is located), the processing circuitry can convey this geographic location information to circuitry in the GPS receiver to assist the GPS receiver in rapidly and accurately processing the received GPS navigation satellite signals. GPS data may be acquired on demand by the processor (i.e., "pulled" towards the processor) or may be pushed from the GPS receiver to the processor (e.g., according to a periodic schedule). In a typical scenario, the GPS receiver provides location data to location engine 108 in the form of geographic coordinates. GPS circuitry 106 may also be used to provide information to engine 108 on the user's velocity and direction of travel and information on the current time.

In addition to receiving signals from GPS circuitry 106 or other satellite navigation circuitry, location engine 108 may receive information on the current time from clock 104. Clock 104 may be implemented as part of an integrated circuit (e.g., a microprocessor, GPS receiver circuitry, etc.).

Sensors may be used to provide location engine 108 with information on the user's movement. For example, sensors that are sensitive to angular orientation such as sensor 100 may be used to convey information on the orientation of device 10 to location engine 108. An example of an orientation sensor that is sensitive to the orientation of device 10 is a three-axis accelerometer. Orientation information may also be obtained from compass-type devices, gyroscope-type devices based on MEMS accelerometer structures or other suitable structures, etc. As indicated schematically by sensors 102, acceleration data such as information on the linear and angular acceleration of device 10 may be provided to engine 108 for processing. Linear acceleration data may include information on the acceleration due to gravity and may, in this respect, be used to produce orientation data. Linear acceleration data may also include information revealing that a user has accelerated when driving an automobile. Angular acceleration data may be produced when, for example, a user turns a corner when driving an automobile. Examples of acceleration sensors 102 include three-axis accelerometers and six degrees-of-freedom ("6 Dof") accelerometers.

As these examples demonstrate, the functionality of sensors 100 and 102 need not be mutually exclusive. For example, a three-axis accelerometer may be used to produce signals indicative of acceleration in x, y, and z dimensions. By comparing the relative strengths of the signals from each of these axes, engine 108 can determine the orientation of device 10 relative to the ground. It may be determined, for example, that the main plane of device 10 is parallel to the ground. Angular orientation sensor 100 may be used to produce the same information. At the same time, some sensors may provide data that others cannot. For example, an accelerometer with vibrating elements may be highly accurate in detecting momentary movements, but may experience long-term drift that would make tracking a device's absolute orientation inaccurate. This type of orientation information may therefore by supplied by a compass-based sensor (e.g., sensor 100).

Determining a user's position, velocity (speed and direction), and acceleration, from the input data provided to engine 108 involves application of the laws of classical mechanics. Consider, for example, the situation of FIG. 6. In the FIG. 6 example, the position of a portable electronic device in a single illustrative dimension is presented. This dimension is labeled "X" on the vertical axis of FIG. 6.

Figure 6:
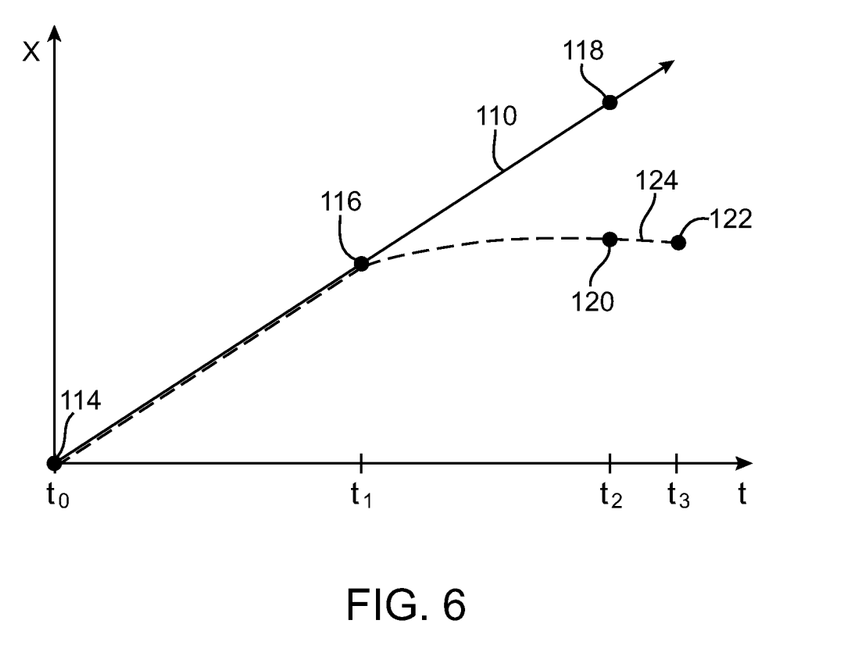
FIG. 6 is a graph comparing the performance of a conventional device to a portable electronic device in accordance with an embodiment of the present invention when computing device location data.

Initially, at time t0, the device is located at point 114 (i.e., X=0). The device is initially traveling at a constant velocity (i.e., acceleration in dimension X is zero), so at time t1, the device is located at point 116. At time t1, the device begins to slow its motion in dimension X, due to a deceleration (negative acceleration) in dimension X. Dashed line 124 represents the actual position X of the device as a function of time. Due to the deceleration that began at time t1, the X position of the device increases at a decreasing rate. At time t2, the position of the device has reached point 120. By time t2, the device has ceased to move substantially along dimension X, so at time t3, the X position of the device at point 122 is substantially unchanged from its position at time t2.

Application of the laws of classical mechanics by location engine 108 allows device 10 to accurately calculate the location of device 10 in this type of scenario. Engine 108 may obtain GPS data from a GPS receiver or other suitable global satellite navigation system circuit. This satellite data may, for example, provide the X position and velocity of device 10 when device 10 is at point 114. Because no acceleration is present at point 114 (in this example), engine 108 can calculate the X position of point 116 using the formula X=vt, where X is the position along dimension X, v is the velocity of device 10 along dimension X, and t represents time. After time t1, a signal from an X-axis accelerometer provides engine 108 with acceleration data that engine 108 can use to calculate the position of device 10, even when engine 108 has not yet been able to acquire another GPS data point. In portable devices without accelerometers and other motion and orientation sensors, however, it would not be possible to detect the deceleration of the device at time t1 (i.e., between acquired GPS points), so that the device position might be erroneously determined to coincide with point 118 along solid line 110 at time t2, rather than position 120.

As this example demonstrates, engine 108 can take into account effects that are described by the classical laws of mechanics, such as acceleration and change in orientation resulting from turns, linear acceleration due to speeding up in an automobile or braking, etc. to correct for missing and inaccurate GPS data. This allows device 10 to accurately handle functions that benefit from frequently refreshed and accurate location information. Examples of applications such as these include navigation applications (e.g., with turn-by-turn instructions) and mapping software (whether part of a navigation package or other suitable program). The capabilities of location engine 108 may be implemented as part of a navigation application or other software application, as part of an operating system on device 10, as part of more than one software application, or as parts of multiple software components such as these. Moreover, the use of location engine 108 to supply geographic location information (and, if desired, orientation information and motion information such as changes in position) is merely illustrative. Any suitable motion-related output may be provided such as data on location, direction of motion, linear and angular speeds of motion, linear and angular acceleration, etc.

Figure 7:
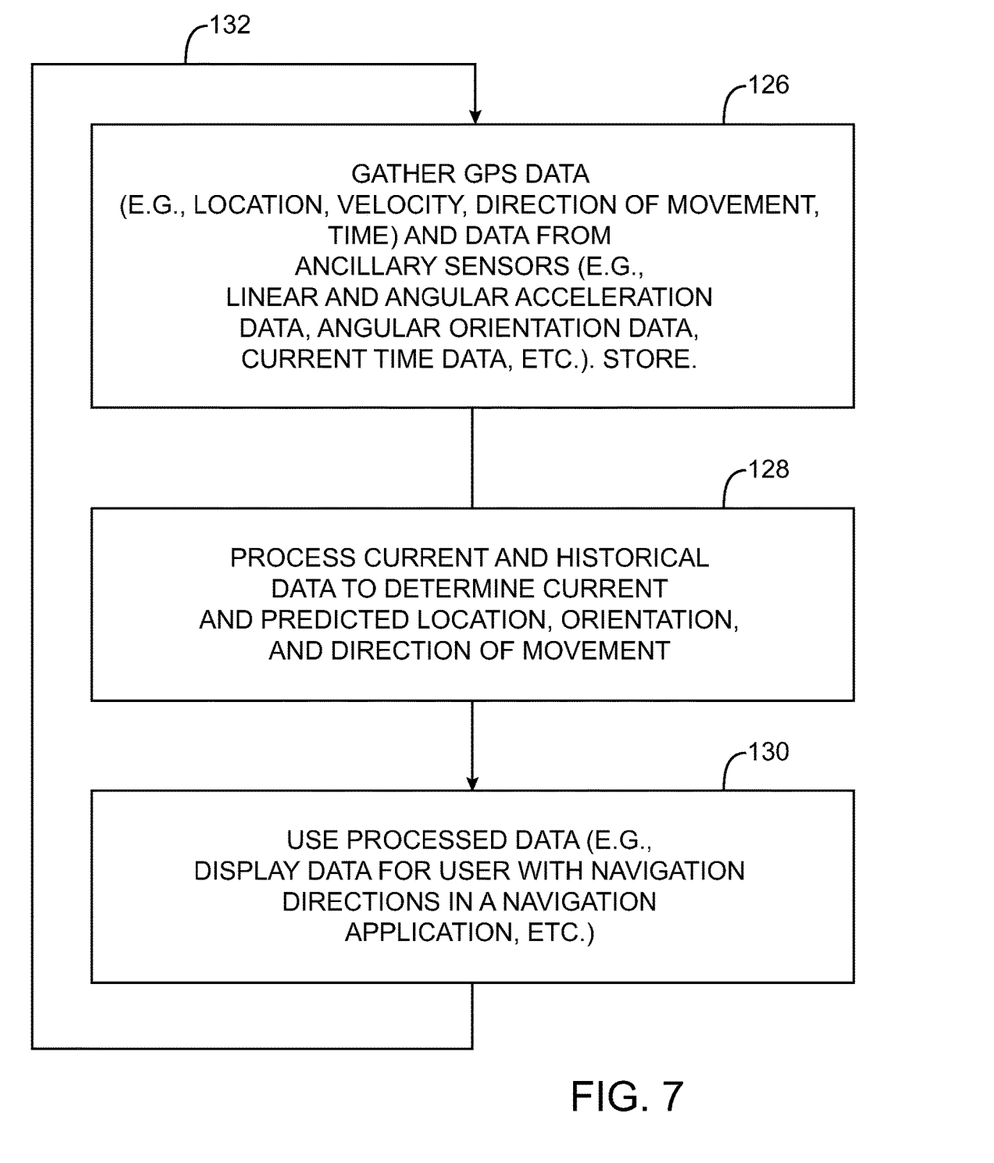
FIG. 7 is a flow chart of illustrative steps involved in using a portable electronic device with location data processing circuitry in accordance with an embodiment of the present invention.

Operations involved in using sensor data and GPS data in device 10 are shown in FIG. 7. At step 126, device 10 may gather GPS data using a GPS receiver. GPS data that is gathered may include, for example, geographic location data, velocity data, direction of motion data, and time data. GPS data may be gathered periodically (e.g., once per a given time period), whenever available (e.g., whenever the receiver indicates that a new position has been acquired), or at any other suitable time. Sensor data may also be acquired during the operations of step 126. The sensor data may be collected more frequency than the GPS data, may be collected with the same frequency as the GPS data, may be collected less frequency than the GPS data, or may be collected using a variety of relative frequencies with respect to the collected GPS data (i.e., asynchronously).

Sensor data may be collected from any suitable sensors. Sensors from which data may be acquired include accelerometers, linear accelerometers, angular motion detection sensors, multi-axis accelerometers, single-axis accelerometers, orientation sensors, compass-based devices, sensors with permanent magnets for measuring orientation relative to the earth's magnetic field, sensors with electromagnetic structures for making measurements of orientation with respect to the Earth's magnetic field, gyroscopes based on rotating elements, accelerometer-type gyroscopes based on linearly vibrating elements, sensors formed from MEMS, sensors formed from micromachined silicon, position sensors, orientation sensors, motion sensors, other suitable sensors, and combinations of such sensors. These examples are not exhaustive and are not mutually exclusive. Moreover, more than one sensor may be used to gather data during step 126 if desired. For example, sensor data may be gathered from both an accelerometer and a compass in device 10 (as an example). Data may also be gathered from a clock. The sensors that produce the data may be used to produce data for multiple destinations (e.g., for a navigation application, for a camera image stabilization function, for a hard-drive protection function, for activity detection functions, for portrait/landscape identification functions, etc.). The data that is gathered may include location data, orientation data (e.g., angular orientation with respect to one, two, or three axes), motion data (e.g., speed, velocity, direction of travel), or any other suitable data such as data on the position, motion, and orientation of device 10. The gathered data may be stored in storage 34.

At step 128, location engine 108 (FIG. 5) may be used to process the acquired data. Location engine 108 may, as an example, use accelerometer data and data from other sensors to correct for potential inaccuracies associated with GPS data such as GPS location data, GPS velocity data, etc. If, as an example, accelerometer and/or compass data indicates that a user has made a turn, this data may be used to update the location of device 10 on a map, without waiting for confirmation from GPS data. This allows device 10 to respond more rapidly to movements of device 10 than if only GPS data were used in determining location and orientation. Moreover, the computations of step 128 may improve location accuracy, so that the position of a user may be determined with greater precision than would otherwise be possible (i.e., if relying solely on GPS data). The use of sensor data to augment GPS data therefore allows smaller GPS antennas and less complex GPS receiver electronics to be used in device 10 while still meeting desired performance criteria. During step 128, engine 108 may process both recently acquired data and, if desired, more historical data (e.g., data from seconds, minutes, hours, or days prior to the sensor and GPS data that has most recently been acquired).

During step 130, the data that is produced by location engine 108 may be used in operating device 10 or other suitable equipment. The processed data may be used to produce any suitable output. For example, output data from engine 108 may be stored in storage 34 (e.g., for use in subsequent processing operations by software on device 10), may be transmitted wirelessly over a communications path such as the paths in FIG. 2, may be presented visually to a user of device 10 (e.g., using display 16 or other suitable visual indicators), may be presented using sound (e.g., in the form of vocalized turn-by-turn navigation directions presented through a speaker in device 10 or a wired or wireless headset), or may be provided to any other suitable equipment or recipient device.

As indicated by line 132, processing may loop back to step 126. The operations of FIG. 7 may be performed at particular intervals when invoked using device 10 or may be performed whenever invoked by appropriate software on device 10 (e.g., a mapping application, an application that presents turn-by-turn navigational assistance, or other suitable software). If desired, the operations of FIG. 7 may be performed when device 10 is instructed to perform some or all of these instructions by an external device.

As the foregoing examples demonstrate, accelerometer data and other sensor data such as compass data may be used to analyze the movement of device 10. Device movement analysis may involve ascertaining the device's orientation and changes in orientation, the device's acceleration, the device's velocity, etc. Sensor data may be used in conjunction with GPS data to enhance the accuracy and timeliness of GPS satellite location data. The satellite location data may also help to enhance the accuracy of position calculations made using the sensors. When data from one or more sensors and, if desired, data from a GPS receiver circuit is used to calculate a device's geographic location, system responsiveness and accuracy may be improved.

The foregoing is merely illustrative of the principles of this invention and various modifications can be made by those skilled in the art without departing from the scope and spirit of the invention.

What is claimed is:

1. A portable electronic device having a housing, comprising:
    a global navigation satellite system receiver that produces satellite location data from received satellite signals;
    an accelerometer in the housing that detects movement of the portable electronic device and that produces corresponding accelerometer signals; wherein the accelerometer comprises at least one vibrating element;
    a sensor with a magnetic element that measures how the portable electronic device is oriented with respect to the Earth's magnetic field and that produces corresponding compass signals; and
    processing circuitry in the housing that computes where the portable electronic device is geographically located based on the satellite location data, the accelerometer signals, and the compass signals, wherein the processing circuitry in the portable electronic device uses at least the compass signals to compute a geographic location of the portable electronic device and wherein the processing circuitry in the portable electronic device uses the compass signals at least to compute a heading change of the portable electronic device.

2. The portable electronic device defined in claim 1 wherein the accelerometer comprises a three-axis accelerometer.

3. The portable electronic device defined in claim 1 wherein the processing circuitry is configured to run a location engine that processes signals from multiple sensors including the accelerometer to improve accuracy in the computed geographic location based on the satellite location data.

4. Circuitry in a portable electronic device having a housing comprising:
    an antenna;
    a global satellite navigation system receiver coupled to the antenna that receives satellite navigation signals and that produces corresponding global satellite navigation system receiver location data;
    an accelerometer in the housing that produces accelerometer data in response to movement of the portable electronic device;
    a sensor with a magnetic element that measures how the portable electronic device is oriented with respect to the earth's magnetic field and that produces corresponding compass signals;
    processing circuitry in the housing that computes the portable electronic device's current geographic location based on the global satellite navigation system receiver location data, the accelerometer data, and the compass signals, wherein the processing circuitry in the portable electronic device uses at least the compass signals to compute a geographic location of the portable electronic device and wherein the processing circuitry in the portable electronic device uses the compass signals at least to compute a heading change of the portable electronic device;
    a radio-frequency transceiver circuitry that receives cellular telephone signals;
    a speaker through which the processing circuitry presents music to a user; and
    a display on which a map and a visual indicator of current geographic location are displayed.

* * * * *